Jan. 16, 1934.　　　　J. E. TREANOR　　　　1,943,903
CARBONATING APPARATUS
Filed Nov. 11, 1931　　　2 Sheets-Sheet 1

INVENTOR:
JOHN E. TREANOR,
By

ATTORNEY.

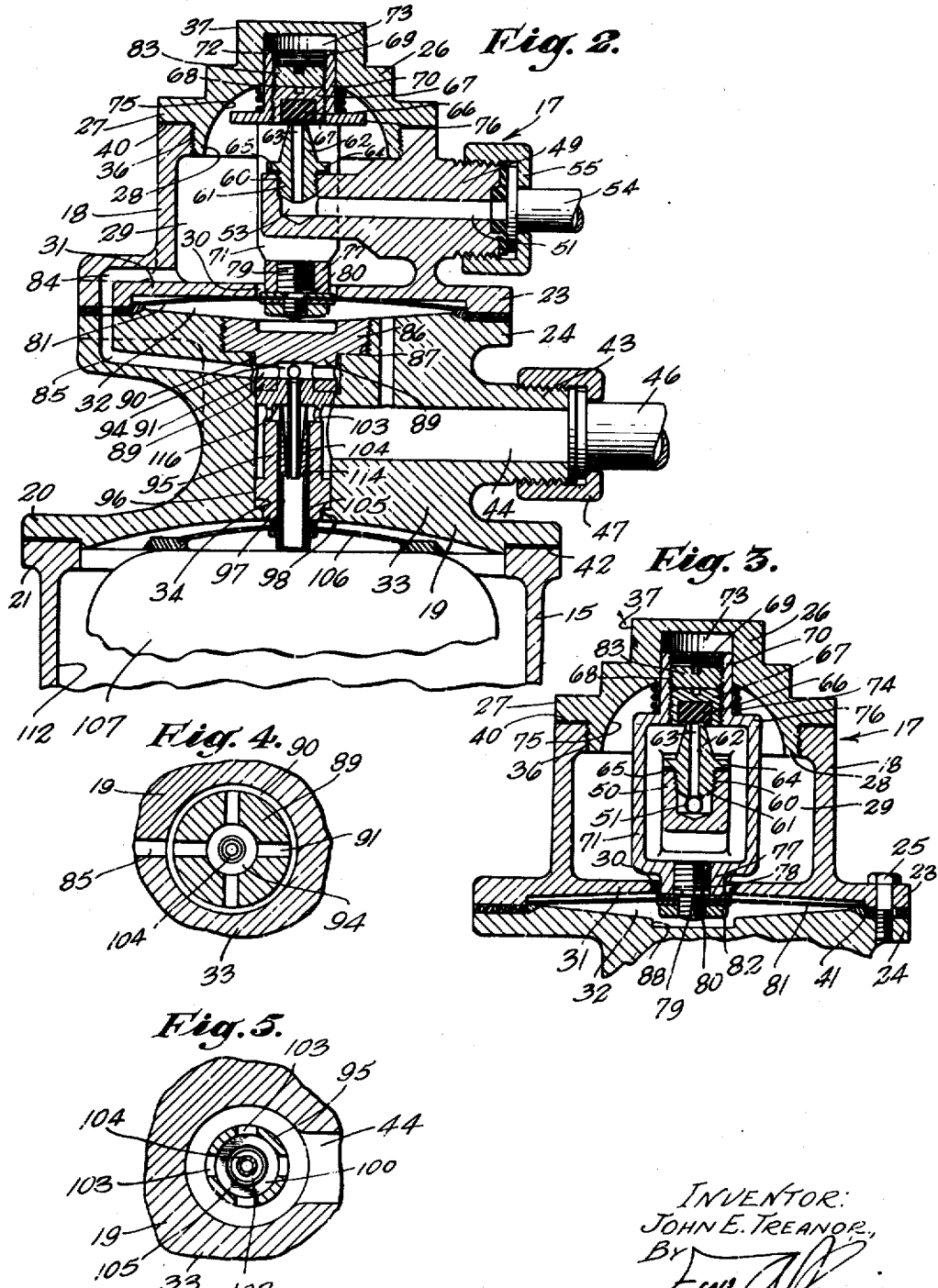

Patented Jan. 16, 1934

1,943,903

UNITED STATES PATENT OFFICE 1,943,903

CARBONATING APPARATUS

John E. Treanor, Nogales, Ariz.

Application November 11, 1931
Serial No. 574,324

15 Claims. (Cl. 261—75)

My invention relates to carbonating apparatus of the character of self-controlled and automatic operation, and is an improvement on my prior invention of the same general type, as set forth in application Serial 37,584, filed June 16, 1925, which has matured into Patent No. 1,840,859, dated January 12, 1932.

In designing my original carbonator, the object was to create an apparatus of extremely small compass which would be available for use in cooling compartments of fountains, kegs, and dispensing cabinets, and which would produce a high grade of charged water with varying draft arm opening and at varying pressures of either or both gas and water above the pressure required to absorb the amount of carbon dioxide gas necessary to produce a commercial product.

It is the principal object of my present invention to produce a carbonating apparatus by which is effected a more perfect and absolutely automatic control of the water and gas supply thereto and one in which a carbonating equilibrium of gas and water is more constantly maintained.

In certain types of carbonators there exists a tendency for the gas-head to flood with water during periods of relatively long duration, for example, over night. This has proved to be due to one or all of four causes. First, an imperfect closure against the entrance of water into the interior of the water nozzle; second, a pumping action in the water supply line, resulting from fluctuations of the water pressure therein; third, changes in temperature of both water and gas, resulting in changes in volume, inducing further pumping action; and, fourth, absorption of the residual gas in the gas by-pass and gas-head by the injected water.

Another object of my invention is to provide a carbonator with means effectually eradicating the evils of gas-head flooding.

Another defect encountered in the use of prior carbonating apparatus which had to be considered was the ever varying draft arm opening. The complete coordination of the variable elements had apparently baffled every effort toward solution and an exhaustive series of experiments and a critical analysis of the principles involved were undertaken in an endeavor to overcome these defects.

During the course of these experiments with carbonating apparatus of the diaphragm type, it was determined that the poor carbonation attending partial draft arm openings, was caused by a complete or partial equalization of pressures on both sides of the diaphragm, thereby cutting off, or partially cutting off, the gas supply to the gas-head, in consequence of which, carbonation was partially or completely suspended until the draft arm opening was changed. The experiments also proved that carbonation proceeded directly proportional to the draft arm opening. With extremely small draft arm openings, carbonation was practically nil, but with successively larger draft arm openings, it gradually improved to a point where the draft arm was about half open, and from then on to full opening the carbonation would be excellent.

A further object of my invention is to provide an apparatus of the character described with means for effecting a more perfect carbonation.

Likewise in certain carbonating apparatus the float was a weak point in the operation of the carbonator, due, first, to the lack of net buoyancy of the float, and, second, to the relentless downward thrust of the hydraulic jet issuing from the water tube resultant of the following conditions. As soon as the draft arm was opened, the float would be jammed downward into the bottom of the carbonator tank and held there by the powerful hydraulic jet projected downward into the float well from the water tube nozzle until such time as the draft arm was at least partially closed, when it would bob up and proceed to regulate the balance between the water and gas.

A still further object of my invention is to minimize the downward hydraulic thrust on the float and to regulate the balance between the water and gas.

In certain other prior carbonating apparatus there existed a deficiency in the net buoyancy of the float body.

A further object of my present invention is to provide an apparatus of this character with float means fully adequate to meet all buoyancy requirements.

I will describe only one form of improved carbonating apparatus embodying my invention, and will then point out the novel features thereof in the appended claims.

In the drawings,—

Fig. 2 is an enlarged fragmentary vertical sectional view of the assembly head and adjacent parts with the water valve in closed position and the gas valve in open position.

Fig. 3 is a vertical sectional view taken on the line 3—3 of Fig. 1.

Fig. 4 is a horizontal sectional view taken on line 4—4 of Fig. 1.

Fig. 5 is a horizontal sectional view taken on line 5—5 of Fig. 1.

Figure 1:
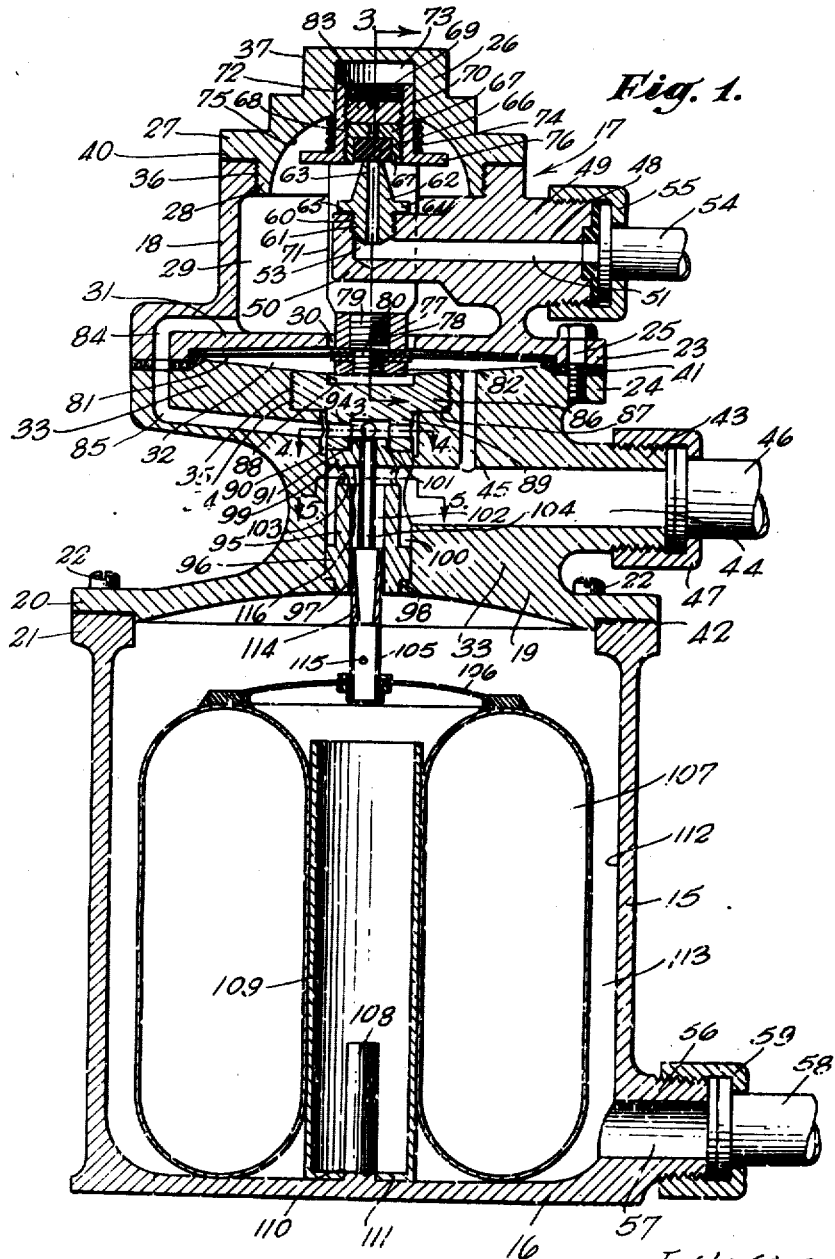
Fig. 1 is a view showing in vertical section and in elevation the carbonating apparatus embodying my invention.

Referring specifically to the drawings, in which similar reference characters refer to similar parts in each of the views, my invention in its present embodiment comprises a tank 15 preferably in the form of a casting having a closed lower end 16 and a gas-head assembly generally designated at 17 supported thereon. The gas-head assembly consists essentially of a casting composed of upper and lower sections 18 and 19. Section 19 is provided at its lower end with a flange 20 adapted for connection to a flange 21 provided on the upper end of the tank 15 by means of bolts 22. Likewise, sections 18 and 19 are provided with cooperating flanges 23 and 24, and bolts 25 are passed through suitable openings therein and serve to hold the sections in superimposed position on the upper end of tank 15. A cap casting 26 for closing the open upper end of section 18 is provided with a flange 27 and a threaded extension 28. The upper walls of section 18 provide a chamber 29 which communicates through a centrally disposed opening 30 in the base wall 31 with a diaphragm chamber 32 formed between the base wall 31 and the upper end of the body 33 of the lower section 19. Section 19 at approximately its central part is provided with a vertical passage 34 which communicates at its upper end with the diaphragm chamber 32 and at its lower end with tank 15. The passage 34 at its upper end is counterbored and the walls of said counterbore are threaded at 35 for a purpose to be hereinafter described.

The threaded extension 28 of cap casting 26 is adapted to be screwed into a correspondingly threaded opening 36 in the upper end of section 18 by means of a squared formation 37 adapted to be gripped by a wrench or other suitable tool. A packing ring 40 is placed between the upper end of section 18 and flange 27 of cap casting 26 and provides a seal at this point. Likewise, packing rings 41 and 42 are placed between the confronting surfaces of sections 18 and 19 and the lower section 19 and the flange 21 of tank 15 respectively, thereby providing adequate seals at these points.

Section 19 is formed with a projection 43, and a horizontal water passage 44 extends through the projection 43 and body 33 of section 19 and communicates at its inner end with the passage 34. A by-pass 45 establishes communication between water passage 44 and diaphragm chamber 32. A pipe 46 leading from a water supply system communicates with the passage 44, being connected to said projection 43 by a coupling 47. In this manner water from a supply system is introduced into the carbonating apparatus.

Section 18 is provided with an exterior projection 48, and the thickened wall 49 of the section is formed with an inwardly directed, horizontally disposed extension 50. Projection 48 and extension 50 are formed integral with the wall 49 of section 18 and extend in the same plane. A gas passage 51 extends through projection 48, the thickened wall portion 49, and extension 50. Extension 50 adjacent its inner end, and on the upper surface thereof, is bored to provide a vertical passage 53 which intersects the gas supply passage 51. A pipe 54 leading from the gas supply source is connected to projection 48 by a coupling 55.

Likewise tank 15 adjacent its lower end is provided with a projection 56 having an outlet passage 57, and a pipe 58 leading to the draft arm of a dispensing apparatus, not illustrated, is connected to said projection by a coupling 59.

Vertical passage 53 of extension 50 adjacent its upper end is interiorly screw-threaded at 60 for the reception of the threaded end 61 of a gas nozzle 62, the latter having a centrally disposed passage 63 extending therethrough which communicates at its lower end with gas supply passages 53 and 51. Gas nozzle 62 is formed with an annular flange 64 which when said nozzle is screwed tightly into passage 53 is disposed flush with the upper surface of extension 50, and a washer or gasket 65 is interposed between these surfaces to provide a gas seal at this point. The upper part of the gas nozzle 62 is tapered inwardly and is adapted under certain conditions to engage a nozzle seat 66 preferably constructed of rubber or rubber composition material. Nozzle seat 66 due to its inherent resiliency is retained within a suitable opening provided in the lower face of a seating nut 67. Seating nut 67 is exteriorly threaded at 68 and is adjustably mounted in the threaded bore 69 of a collar member 70 which forms the upper part of a yoke 71. Collar member 70 has a tubular extension 72 having a sliding fit in a central opening 73 provided on the interior surface of cap 26, and a spring 74 preferably constructed of bronze is coiled around extension 72 with its opposite end coils engaging against a curved wall 75 of cap 26 contiguous to the opening 73 and a flange 76 of collar member 70.

Yoke 71 is provided at its lower end with a base portion 77 which is slidably mounted in opening 30 in the wall 31 of section 18, and has an interiorly threaded bore 78 adapted to receive a threaded plug 79. Plug 79 has a threaded extension 80 of slightly less diameter, and said extension 80 is adapted for position within an opening provided centrally of a diaphragm 81 disposed in chamber 32. A nut 82 is adjustable on extension 80 for the purpose of securely connecting the diaphragm 81 to the yoke 71. In this manner it is readily perceived that collar member 70, yoke 71, and base portion 77 are integral and that any movement of the diaphragm is transmitted to the yoke which operates vertically through chamber 29 of gas-head 17. In this connection it may be stated that resultant of connecting the diaphragm 81 to the yoke 71, in the manner described, there is a relative movement between the nozzle seat 66 and the gas nozzle 62, induced by pressure in either direction upon diaphragm 81.

Nozzle seat 66 may be adjusted relative to the upper end of the gas nozzle 62 by adjusting the seating nut 67 in the threaded bore 69 of collar member 70 and a lock nut 83 holds the seating nut 67 against rotation in said bore.

Gas by-passes 84 and 85 connect chamber 29 of the gas-head with the vertical opening 34 of section 19. A retaining nut 86 having exterior threads 87 is adjustably mounted in the threaded counterbore of opening 34, the upper surface of said nut being provided with a central recess 88 which is adapted to accommodate the nut 82 holding the diaphragm on the yoke 71 when said diaphragm is in its lowest position.

Retaining nut 86 is provided with a restricted lower portion 89 which loosely fits within the vertical opening 34 of section 19, thereby providing an annular channel 90 thereabout. This channel 90 is in register with the gas by-pass 85, and likewise the lower portion 89 of the retaining nut 86 is provided with a series of radially extending ports 91 which communicate with annular channel 90, as clearly illustrated in Fig. 4. The inner ends of ports 91 open into a central cavity 94 of retaining nut 86.

Mounted in the vertical opening 34 of section 19 is a cage 95 having an enlarged base 96 and a restricted lower end portion 97, which latter seats in an opening 98 provided in the lower part of section 19 and which communicates with the interior of tank 15. Cage 95 at its upper end is provided with a head 99 which makes a close fit with the walls of opening 34, and that portion of the body of the cage between base 96 and head 99 is of less diameter than those parts and thereby provides an annular chamber 100 which communicates directly with the water passage 44. Head 99 is provided on its upper end with an extension 101 which fits within the central cavity 94 of the retaining nut 86. Cage 95 is formed with a central bore 102 leading upwardly from the base 96 and base extension 97, and said bore 102 communicates with the annular chamber 100 through openings 103 provided in the body of the cage immediately below head 99.

Adapted to extend through the bore of the cage from head 99 to a point adjacent the base 96 is a gas tube 104, the upper end of which opens into the central cavity 94 of retaining nut 86.

A combining tube 105 is slidably mounted in the central bore 102 of cage 95 and the lower end of said tube is swivelly connected to a spider 106, said spider being suitably attached at its opposite ends to a hollow float body 107.

Tank 15 is provided centrally of its base 16 with a vertical pin 108, and a well tube 109 has a centrally disposed opening 110 in its closed lower end 111 through which pin 108 is adapted to extend, the pin functioning to hold the well tube in upright position in the tank.

Well tube 109 is disposed in vertical alignment with the combining tube 105, and provides not only guide means for the float body 107 in the tank, but also centralizes the float 107 relative to interior wall 112 of the tank 15, thus forming a space 113 which communicates with the outlet passage 57 for the carbonated water.

Gas tube 104, as heretofore explained, extends downward from the cage head 99 through the central bore 102 of cage 95, and normally its lower end is disposed on a level with the upper end of the combining tube 105; that is to say, when the float 107 is at its lowest point, as illustrated in Fig. 1.

The construction and arrangement of combining tube 105 relative to gas tube 104 forms a very important part of my invention and will now be described.

The combining tube 105 which is slidably received within the bore 102 of cage 95, is formed interiorly of its upper end with a downward and inward tapered nozzle 114, and adjacent its point of connection with spider 106 said tube is provided with openings 115 communicating with the interior of tank 15. The tapered nozzle 114 when tube 105 is at its lowest position registers its upper and largest diameter with the lower end of gas tube 104.

The tapered nozzle 114, as clearly illustrated, is located in the extreme upper end of combining tube 105 and the diameter of the opening in the lower end of the tapered nozzle is such as to accommodate with liberal clearance the straight walled end of gas tube 104, which is of such length that its extreme lower end registers with the extreme lower end of the nozzle 114 when the combining tube 105 is at its greatest upward travel. When the combining tube 105 is at its lowest travel, the lowest point of gas tube 104 is slightly below the extreme upper end of the tapered nozzle 114. It may thus be clearly seen that the extreme lower end of the gas tube 104 is never out of the taper zone of nozzle 114 and the area of the annular opening between the gas tube 104 and the tapered part 114 of combining tube 105 is so proportioned that in whatever position the latter may be, the annular area between the two will always be less than the area of the opening in the lower end of the tapered nozzle 114, with the result that whenever the draft arm is opened, a positive pressure differential is generated equal to the pressure necessary to overcome the resistance met by the water in the restricted annular opening in the tapered nozzle 114. This pressure differential is evidenced by a double effect, i. e., an increased pressure on the under side of the diaphragm, and a decreased pressure on the upper side of the same, with the result that the gas nozzle seat 66 is raised from the gas nozzle 62, automatically admitting sufficient gas for perfect carbonation for all degrees of draft arm opening.

The operation of my improved carbonator will now be described.

Presuming the carbonator to be properly connected to the gas and water under pressure and a draft arm not illustrated, pressure gas from pipe 54 will flow through inlet passage 51 and into gas nozzle 62 and is held in nozzle passage 63 and passages 51 and 53 of wall 49 of section 19 until such time as the nozzle seat 66 is raised, due to the action of superior water pressure under diaphragm 81 through the by-pass 45. When the gas nozzle seat 66 is raised from gas nozzle 62, gas flows into the chamber 29 of the gas-head, then through the by-passes 84 and 85 to the openings 91 of the retaining nut 86, and downwardly into the gas tube 104, which forms a part of cage 95.

Pressure water from pipe 46 enters through passage 44, a part passing upward through the by-pass 45 to the under side of the diaphragm 81, lifting the yoke 71 and consequently nozzle seat 66 from gas nozzle 62, thus admitting gas into the chamber 29 of the gas-head 17. This gas, as already described, will pass from chamber 29 through by-passes 84 and 85 and ports 91 and into the gas tube 104.

Assuming the tank 15 to be empty of water, the float assembly moving as a unit will occupy the position of its lowest travel, as illustrated in Fig. 1. The tube 105 of the float assembly positioned in the lower part of bore 102 of cage 95 has its tapered nozzle 114 when in the lowest position registering its upper and largest diameter with the lower end of gas tube 104. The area of annular space 102 between nozzle 114 and the wall of gas tube 104 is at a maximum in this position and successively becomes less as water tube 105, together with nozzle 114, is moved upward by virtue of float 107 responding to the admission of water to tank 15 until a point is reached where the tapered bore of nozzle 114 is only slightly larger in diameter than the diameter of gas tube 104, in this position practically all of the liquid being cut off. However, the clearance between gas tube 104 and the smallest diameter of the nozzle 114 permits a free upward movement of tube 105 to a point where the upper end of tube 105 contacts with the lower surface of the head 99 of cage 95 which resultantly provides a seat 116 for tube 105 and effectually cuts off the passage of liquid through tube 105.

Assuming the tank 15 to be filled with water to a point where float 107 has attained its maximum buoyancy and is at its greatest upward travel (as illustrated in Fig. 2), the upper end of tube 105 has contacted the seat 116 and the gas tube 104 has practically plugged the nozzle 114. Now if the draft arm (not illustrated) is opened, the following operations will occur. Instantly water will flow from the draft arm and the water level in the tank 15 will begin to fall and at the same time a slight drop in pressure will be registered and reflected on the upper side of the diaphragm (as at all times there is a clear unobstructed passage from the gas head chamber 29 to tank 15, this being the avenue through which is effected the equalization of pressures between the tank and the upper side of the diaphragm, whenever the draft arm is closed). Thus the diaphragm moves upward due to superior water pressure on its lower side and this in turn raises seat 66 from gas nozzle 62, admitting gas to the tank, maintaining water pressure, and expelling further quantities of water from the tank, thereby lowering float 107 (which has become a gravity element), together with tube 105 and nozzle 114. Therefore the annular space between nozzle 114 and gas tube 104 is increased to a point where the required amount of water may pass to meet the draft arm requirements, at which time the water level in tank 15 will become stationary.

The area of the annular space between the lower end of gas tube 104 and nozzle 114, together with the quantity of water that may pass under a given pressure, is variable and depends upon the height of water and the position of the float 107 in the tank 15. This annular space is, for all positions of nozzle 114, the most restricted opening met by the water in its passage from its pressure source to the draft arm. Here too is developed the highest velocity, which is extremely favorable for carbonation.

Whenever the draft arm is opened, even to the smallest extent, a difference in pressure is developed between the inlet and outlet sides of the nozzle 114. The higher pressure on the inlet side is transmitted to the under side of diaphragm 81, through water by-pass 45, overcoming the tension exerted by spring 74 on yoke 71 and raising the nozzle seat 66 from gas nozzle 62 admitting gas to the body of the carbonator until the draft arm is closed. After the draft arm is closed, all pressures will become equalized through gas by-passes 84 and 85, and the yoke spring 74 will force nozzle seat 66 against gas nozzle 62 until the draft arm is again opened.

The water as it passes through the annular opening between nozzle 114 and gas tube 104 produces a partial vacuum into which the gas from the gas tube is drawn. The hollow column of water issuing at high velocity from the tapered nozzle 114 expands and fractionates on the wall of the lower end of tube 105 and produces a partial vacuum at the gas ports 115 into which a flood of gas rushes and combines with the descending column of water in the lower end of tube 105. This doubly gas-treated stream then passes on down into the well tube 109 impinging on the bottom thereof, and then ascending through well tube 109 against the powerful descending jet from nozzle 114, and finally escaping at the top of the well tube 109. At this time a mass of bubbles due to agitation is deflected by spider 106 into the tank 15 where a complete separation of surplus gas and carbonated water is effected. The surplus gas which is liberated provides the supply necessary for use at the gas ports 115 in tube 105. The carbonated water is drawn out of the tank through the outlet 57 and pipe 58 which latter is directly connected to the draft arm.

I claim as my invention:

1. In a carbonating apparatus, the combination of: a tank; a float member movable in said tank; means providing a well in said tank within but independent of said float; walls forming a water inlet and a gas inlet; a gas tube in communication with said gas inlet; valve means controlling the passage of gas through said gas tube; and a water nozzle surrounding said gas tube, said water nozzle being in communication with said water inlet and being movable with said float, said gas tube and water nozzle being arranged to discharge gas and water into said well.

2. In a carbonating apparatus, the combination of: a tank; a float member movable in said tank; means providing a well in said tank within but independent of said float, and said well providing a guide means for said float; walls forming a water inlet and a gas inlet; a gas tube in communication with said gas inlet; valve means controlling the passage of gas through said gas tube; and a water nozzle surrounding said gas tube, said water nozzle being in communication with said water inlet and being movable with said float, said gas tube and water nozzle being arranged to discharge gas and water into said well.

3. In a carbonating apparatus, the combination of: a tank; a float member movable in said tank; means providing a well in said tank within but independent of said float; walls forming a water inlet and a gas inlet; and gas and water mixing means in communication with said gas and water inlets, and in operative connection to said float, said mixing means being arranged to discharge water and gas into said well.

4. In a carbonating apparatus, the combination of: a tank; a float member movable in said tank; a well member in said tank independent of said float; centralizing means for said well member; walls forming a water inlet and a gas inlet; and gas and water mixing means in communication with said gas and water inlets, and in operative connection to said float, said mixing means being arranged to discharge water and gas into said well.

5. In a carbonating apparatus, the combination of: a tank; a float member movable in said tank, said float having a central opening; a well member in said tank independent of said float and resting in said central opening thereof; walls forming a water inlet and a gas inlet; and gas and water mixing means in communication with said gas and water inlets, and in operative connection to said float, said mixing means being arranged to discharge water and gas into said well.

6. In a carbonating apparatus, the combination of: a tank; walls forming a gas inlet and a water inlet therefor; a gas tube in communication with said gas inlet; a water nozzle in communication with said water inlet, and having an internal conical opening at its extreme upper end, said gas tube and water nozzle being telescopically arranged; and control means for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

7. In a carbonating apparatus, the combination of: a tank; walls forming a gas inlet and a water inlet therefor; a gas tube in communication with said gas inlet; a water nozzle in communication with said water inlet, and having an internal conical opening at its extreme upper end, said gas tube and said water nozzle being telescopically arranged, and said gas tube having an unobstructed movement into said water nozzle; and control means for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

8. In a carbonating apparatus, the combination of: a tank; walls forming a gas inlet and a water inlet therefor; a gas tube in communication with said gas inlet; a water nozzle in communication with said water inlet, and having an internal conical opening at its extreme upper end, said water nozzle being adapted to surround said gas tube, the smallest diameter of the opening of said water nozzle being larger than any portion of said gas tube which at any time rests in said water nozzle; and control means for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

9. In a carbonating apparatus, the combination of: a tank; walls forming a gas inlet and a water inlet therefor; a gas tube in communication with said gas inlet; a water nozzle in communication with said water inlet, and having an internal conical opening at its upper end, said gas and water nozzle being telescopically arranged; and a float in said tank for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

10. In a carbonating apparatus, the combination of: a tank; walls forming a gas inlet and a water inlet therefor; a gas tube in communication with said gas inlet; a water nozzle in communication with said water inlet, and having an internal conical opening at its upper end, said gas tube and said water nozzle being telescopically arranged, and said gas tube having an unobstructed movement into said water nozzle; and a float in said tank for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

11. In a carbonating apparatus, the combination of: a tank; walls forming a gas inlet and a water inlet therefor; a gas tube in communication with said gas inlet; a water nozzle in communication with said water inlet, and having an opening therethrough in communication with said tank, the upper end of said opening being conical, and said conical portion terminating at the upper end of said water nozzle, said water nozzle and said gas tube being telescopically arranged so that said gas tube may extend into said conical portion of said water nozzle; and control means for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

12. In a carbonating apparatus, the combination of: a tank; walls forming a gas inlet and a water inlet therefor; a gas tube in communication with said gas inlet; a water nozzle in communication with said water inlet, and having an opening therethrough in communication with said tank, the upper end of said opening being conical, and said conical portion terminating at the upper end of said water nozzle, said water nozzle and said gas tube being telescopically arranged so that said gas tube may extend into said conical portion of said water nozzle; and a float in said tank for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

13. In a carbonating apparatus, the combination of: a tank; walls forming a gas inlet and a water inlet therefor; a gas tube in communication with said gas inlet; a water nozzle in communincation with said water inlet, and having an opening therethrough in communication with said tank, the upper end of said opening being conical, and said conical portion terminating at the upper end of said water nozzle, said water nozzle being telescopically arranged relative to said gas tube so that said conical portion of said opening may surround said gas tube with different over-lapping distances; and a float in said tank connected to said water nozzle for moving same in accordance with the water level in said tank, said water nozzle and said gas tube delivering a water and gas mixture to said tank.

14. In a carbonating apparatus, the combination of: a tank; walls forming a gas inlet and a water inlet therefor; a gas tube in communication with said gas inlet; a water nozzle in communication with said water inlet, and having an opening therethrough in communication with said tank, the upper end of said opening being conical, and said conical portion terminating at the upper end of said water nozzle, said water nozzle and said gas tube being telescopically arranged so that said gas tube may extend into said conical portion of said water nozzle, whereby in one position of said water nozzle the end of said gas tube will rest in the upper end of said conical portion, and in the other position said gas tube will extend into the smallest part of said conical opening; and control means for producing relative movement between said gas tube and said nozzle in response to the liquid level in said tank, thus causing different amounts of over-lapping of said gas tube and said water nozzle, said gas tube and said water nozzle being adapted to deliver a mixture of gas and water to said tank.

15. In a carbonating apparatus, the combination of: a tank; walls forming a gas inlet and a water inlet therefor; a gas tube in communication with said gas inlet; a water nozzle in communication with said water inlet, and having an opening therethrough in communication with said tank, the upper end of said opening being conical, and said conical portion terminating at the upper end of said water nozzle, said water nozzle being telescopically arranged relative to said gas tube so that said conical portion of said opening may surround said gas tube with different over-lapping distances, whereby in one relative position of said water nozzle and said gas tube the end of said gas tube will rest in the upper end of said conical portion, and in the other position said gas tube will extend into the smallest part of said conical opening; and a float in said tank connected to said water nozzle for moving same in accordance with the water level in said tank, said water nozzle and said gas tube delivering a water and gas mixture to said tank.

JOHN E. TREANOR.

CERTIFICATE OF CORRECTION.

Patent No. 1,943,903.             January 16, 1934.

JOHN E. TREANOR.

It is hereby certified that error appears in the printed specification of the above numbered patent requiring correction as follows: Page 5, line 47, claim 9, after "gas" insert the word tube; and that the said Letters Patent should be read with this correction therein that the same may conform to the record of the case in the Patent Office.

Signed and sealed this 27th day of February, A. D. 1934.

F. M. Hopkins (Seal)                          Acting Commissioner of Patents.

ing adapted to deliver a mixture of gas and water to said tank.

15. In a carbonating apparatus, the combination of: a tank; walls forming a gas inlet and a water inlet therefor; a gas tube in communication with said gas inlet; a water nozzle in communication with said water inlet, and having an opening therethrough in communication with said tank, the upper end of said opening being conical, and said conical portion terminating at the upper end of said water nozzle, said water nozzle being telescopically arranged relative to said gas tube so that said conical portion of said opening may surround said gas tube with different over-lapping distances, whereby in one relative position of said water nozzle and said gas tube the end of said gas tube will rest in the upper end of said conical portion, and in the other position said gas tube will extend into the smallest part of said conical opening; and a float in said tank connected to said water nozzle for moving same in accordance with the water level in said tank, said water nozzle and said gas tube delivering a water and gas mixture to said tank.

JOHN E. TREANOR.

CERTIFICATE OF CORRECTION.

Patent No. 1,943,903.            January 16, 1934.

JOHN E. TREANOR.

It is hereby certified that error appears in the printed specification of the above numbered patent requiring correction as follows: Page 5, line 47, claim 9, after "gas" insert the word tube; and that the said Letters Patent should be read with this correction therein that the same may conform to the record of the case in the Patent Office.

Signed and sealed this 27th day of February, A. D. 1934.

F. M. Hopkins (Seal)            Acting Commissioner of Patents.